United States Patent
Hui et al.

(10) Patent No.: US 7,809,615 B2
(45) Date of Patent: Oct. 5, 2010

(54) ENHANCED AUTOMATED CAPTURE OF INVOICES INTO AN ELECTRONIC PAYMENT SYSTEM

(75) Inventors: Tommy Hui, Foster City, CA (US); Rene Lacerte, Portola Valley, CA (US); Mark Orttung, Menlo Park, CA (US)

(73) Assignee: Bill.com, Inc., Palo Alto, CA (US)

( * ) Notice: Subject to any disclaimer, the term of this patent is extended or adjusted under 35 U.S.C. 154(b) by 0 days.

(21) Appl. No.: 12/060,091

(22) Filed: Mar. 31, 2008

(65) Prior Publication Data
US 2009/0198599 A1 Aug. 6, 2009

Related U.S. Application Data

(60) Provisional application No. 61/025,255, filed on Jan. 31, 2008.

(51) Int. Cl.
G07F 19/00 (2006.01)
H04M 15/00 (2006.01)
G06Q 40/00 (2006.01)

(52) U.S. Cl. .......................... 705/34; 705/40
(58) Field of Classification Search ............... 705/34, 705/40
See application file for complete search history.

(56) References Cited

U.S. PATENT DOCUMENTS

| | | | |
|---|---|---|---|
| 6,108,513 A | 8/2000 | Landa et al. | |
| 6,292,789 B1 | 9/2001 | Schutzer | |
| 6,343,275 B1 | 1/2002 | Wong | |
| 6,360,951 B1 * | 3/2002 | Swinehart | 235/472.01 |
| 6,385,595 B1 | 5/2002 | Kolling et al. | |
| 6,408,284 B1 | 6/2002 | Hilt et al. | |
| 7,317,823 B1 | 1/2008 | Price et al. | |
| 7,536,325 B2 | 5/2009 | Randell et al. | |
| 2002/0128967 A1 | 9/2002 | Meyer et al. | |
| 2002/0133441 A1 * | 9/2002 | Tanaka | 705/35 |
| 2002/0143674 A1 * | 10/2002 | Beckman | 705/34 |
| 2003/0009420 A1 | 1/2003 | Jones | |
| 2003/0033159 A1 * | 2/2003 | Altomare | 705/1 |
| 2003/0069933 A1 | 4/2003 | Lim et al. | |
| 2003/0093414 A1 * | 5/2003 | Litzow et al. | 707/3 |
| 2004/0098338 A1 * | 5/2004 | Uehara et al. | 705/42 |
| 2004/0199427 A1 * | 10/2004 | van der Loo | 705/16 |
| 2004/0216010 A1 * | 10/2004 | Muller | 714/38 |

(Continued)

OTHER PUBLICATIONS

Rene Lacerte: Entrepreneur by Blood: by Alxandra DeFelice: Accounting Technology, Boston, Jan. / Feb. 2008. vol. 24 Iss 1, p. 40, 1 pgs.*

(Continued)

*Primary Examiner*—Matthew S Gart
*Assistant Examiner*—Harshad Parikh
(74) *Attorney, Agent, or Firm*—Fenwick & West LLP

(57) ABSTRACT

The recognition of invoices for multiple issuers and multiple recipients is automated. In one approach, many invoices are received. The received invoices are compared to a database of distinguishing features. These distinguishing features are for known templates of invoices from different issuers. Templates are selected for the invoices based on the comparisons to the distinguishing features. This also identifies the issuers for the invoices. Data is extracted from the invoices based on the selected templates. In this way, invoice capture can be automated.

20 Claims, 3 Drawing Sheets

U.S. PATENT DOCUMENTS

| | | | | |
|---|---|---|---|---|
| 2005/0102608 | A1* | 5/2005 | Batres | 715/505 |
| 2005/0151999 | A1 | 7/2005 | Inikori | |
| 2007/0067240 | A1 | 3/2007 | George | |
| 2007/0260536 | A1 | 11/2007 | Stone | |
| 2007/0271160 | A1* | 11/2007 | Stone et al. | 705/30 |
| 2007/0288364 | A1* | 12/2007 | Gendler | 705/39 |
| 2008/0015982 | A1 | 1/2008 | Sokolic et al. | |
| 2008/0033851 | A1* | 2/2008 | Williams et al. | 705/34 |
| 2008/0046363 | A1* | 2/2008 | Ali et al. | 705/40 |
| 2008/0162311 | A1* | 7/2008 | Hendrix et al. | 705/34 |
| 2008/0249936 | A1* | 10/2008 | Miller et al. | 705/40 |
| 2008/0249951 | A1 | 10/2008 | Gilder et al. | |
| 2008/0319882 | A1* | 12/2008 | Wyle | 705/31 |
| 2009/0063206 | A1* | 3/2009 | Payne et al. | 705/5 |
| 2009/0132286 | A1* | 5/2009 | Blaquier | 705/3 |
| 2009/0164325 | A1* | 6/2009 | Bishop et al. | 705/17 |
| 2009/0182605 | A1* | 7/2009 | Lappas et al. | 705/8 |
| 2009/0204522 | A1* | 8/2009 | Meyer et al. | 705/34 |
| 2009/0292619 | A1* | 11/2009 | Kagan et al. | 705/26 |
| 2010/0114766 | A1* | 5/2010 | Gustin et al. | 705/40 |
| 2010/0161466 | A1* | 6/2010 | Gilder | 705/34 |

OTHER PUBLICATIONS

Computers, business syatems and office eproducts, Avery Susan, Purchasing, Boston, Jul. 11, 1996. vol. 120, Iss 11: p. 125, 10 pages.*

* cited by examiner

ENHANCED AUTOMATED CAPTURE OF INVOICES INTO AN ELECTRONIC PAYMENT SYSTEM

CROSS-REFERENCE TO RELATED APPLICATION

This application claims priority under 35 U.S.C. §119(e) to U.S. Provisional Patent Application Ser. No. 61/025,255, "System and Method for Enhanced Capture of Invoices into an Electronic Payment System," filed Jan. 31, 2008. The subject matter of all of the foregoing is incorporated herein by reference in its entirety.

BACKGROUND OF THE INVENTION

1. Field of the Invention

This invention relates generally to automated computer processing of invoices.

2. Description of the Related Art

For several years companies have been trying to move transactions into an electronic system. Large businesses have the resources and scale to justify the installation of new electronic systems. However, for a large segment of small and medium size enterprises (SMEs), such attempts have not fared well, because it is not cost effective for SMEs to install a dedicated system and there is no standardized transaction system to allow the sharing of costs among many different businesses. For example, each bank offers its own web site payment option, and companies such as Quicken offer either online or check printing or manual check writing as payment methods. However, invoice entry is entirely manual. As a result, it is still the general practice for businesses to send paper invoices to customers, which the customers then process manually.

What is needed are approaches that allow the integration of paper and/or electronic document invoices into an automated system in an enhanced way such that transactions do not require as much manual labor (such as manual input of invoices) as they currently do. What is further desired is that these transactions may eventually be moved into a fully electronic transaction system.

SUMMARY OF THE INVENTION

The present invention overcomes the limitations of the prior art by automating the recognition of invoices for multiple issuers and multiple recipients. In one approach, many invoices are received. The received invoices are compared to a database of distinguishing features. These distinguishing features are for known templates of invoices from different issuers. Templates are selected for the invoices based on the comparisons to the distinguishing features. This also identifies the issuers for the invoices. Data is extracted from the invoices based on the selected templates. In this way, invoice capture (and settlement) can be automated.

In another aspect of the invention, a community of recipients helps to refine the overall process. For example, the community of recipients may provide input concerning the distinguishing features for templates, and this input may be used to define or refine the distinguishing features. The community may also provide input concerning the templates themselves (e.g., the locations of various fields of data), and this input may be used to define or refine the templates. A more organized community process may even be used to regulate the input provided by the community.

Various techniques can be used to distinguish invoices from each other, and to extract data from recognized invoices. Various techniques may also be used to develop and refine the distinguishing features as well as the templates.

Other aspects of the invention include program code, systems and devices corresponding to the methods described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
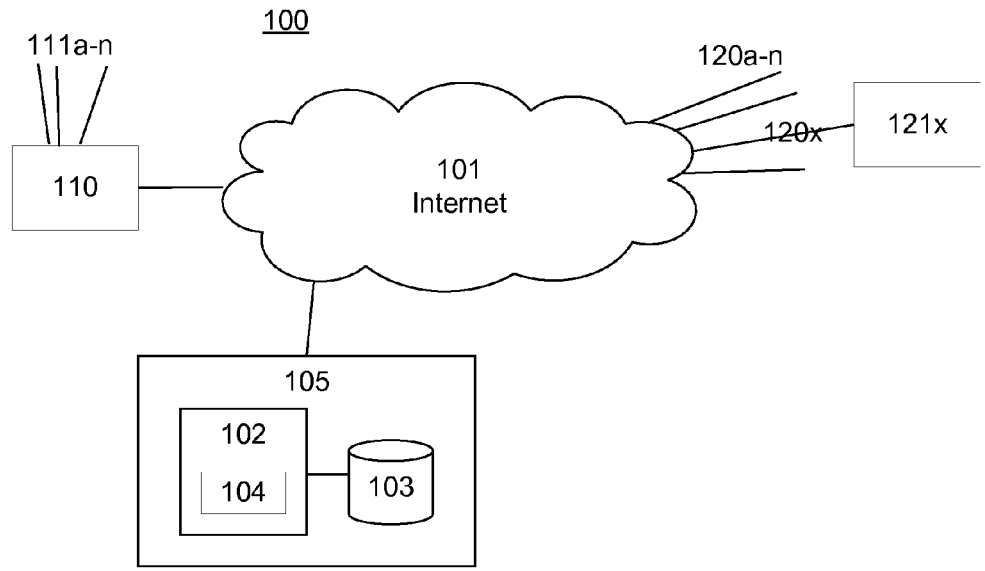
FIG. 1 is a block diagram of an exemplary system 100 according to an aspect of the invention.

FIG. 1 shows an overview of an exemplary system 100 according to an aspect of the invention. An electronic service provider 110, such as eFax Services, is connected to the Internet 101. Other intranet or networks could be used instead of the Internet. Also connected to electronic service provider 110 are multiple fax lines 111a-n for receiving faxed invoices. Customer sites 121a-n (of which, for clarity and simplicity, only 121x is shown) connect to the Internet 101 via connections 120a-n. Corporate site 105 of an operator of this exemplary system is represented here by a server 102, a storage system 103, and software 104 installed on the server 102. The actual architecture of such a system may, and in most cases probably will, comprise many servers, multiple storage systems and/or hard drives, and multiple instances of software. All these possible components are represented here by the single instances of the components of site 105.

Figure 2:
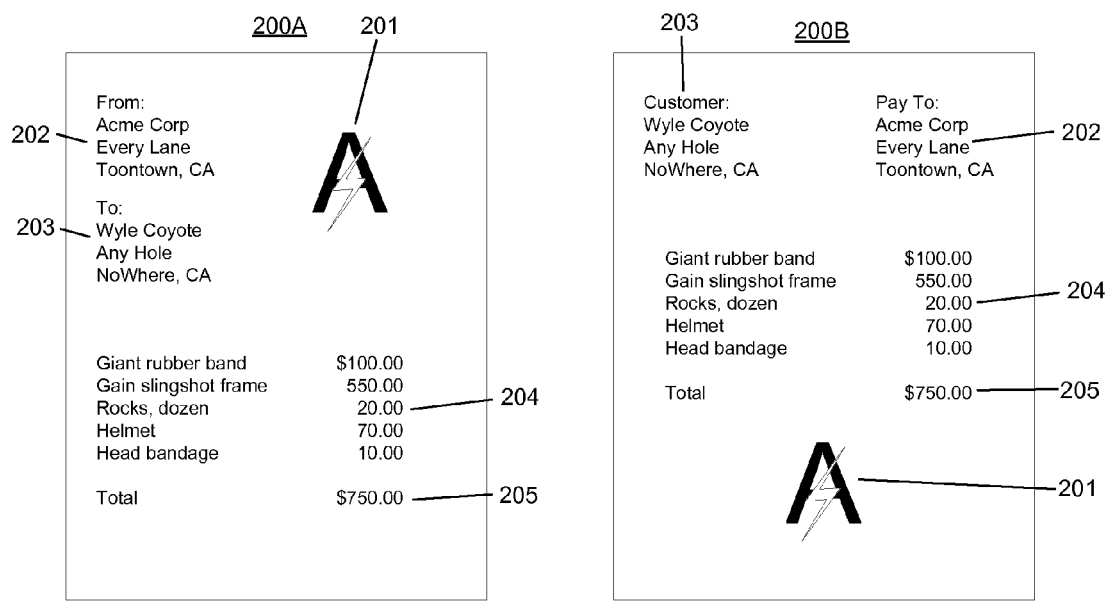
FIG. 2 are diagrams of exemplary invoices.

FIG. 2 shows typical invoices as received, represented here as exemplary invoices 200A and 200B. These invoices are issued by one party (the issuer) to another party (the recipient). Invoices 200A and 200B contain the following data, although with a slightly different layout: issuer logo 201, issuer name and address 202, recipient address 203, line items 204 and total amount due 205. Other additional data such as terms, due date, etc., are not shown in FIG. 2, but such data are customarily included on typical invoices.

One aspect of the invention includes approaches for recognizing an invoice, for example identifying the issuer of the invoice and/or recognizing the layout of the invoice. Invoices can be recognized by comparing them to a database of distinguishing features. For example, invoices might be recognized based on the logo of the issuer, name and/or address of the issuer, or other data or signature features that are unique to an issuer. Once an invoice is recognized, a corresponding template can be applied to extract the relevant data from the recognized invoice.

There are various modes by which an invoice may be entered into the system and various media on which the invoice may be received. For example, the recipient of a paper invoice could fax it to a dedicated fax number for that recipient's account, such as, for example, any of fax numbers 111a-n shown in FIG. 1. Alternately, the recipient of the invoice could instruct any entity issuing invoices to them to fax the invoices directly to said account's dedicated fax number. In yet another case, an invoice recipient may have a customized email address residing on or connected to server 102, to which invoices may be emailed with attached files of any of various popular word processing or accounting or image capture programs, such as, for example, MS Word or Adobe Acrobat. In any case such a file may be converted into an image file showing the image of the invoice. In the case of a Word file, depending on the complexity of the format, direct parsing may be applied. Alternately, the file may be printed to an Adobe Acrobat .portable document file (.pdf) file and then processed as an image.

Once received, invoices can be recognized using many different types of distinguishing features besides those discussed above. Additional examples include but are not limited to black/white histograms, color histograms, sectional signatures and sectional histograms. OCR (optical character recognition) can also be used as part of the recognition process. It can be applied to just the header, to the entire invoice or to any part of the invoice. The result of the OCR can be used as the basis for recognizing an invoice. Alternately, OCR can be applied after an invoice has been recognized, in order to extract data from the invoice. Other examples of distinguishing features include metadata (e.g., fax number, issuer e-mail address, subject line, pdf- or Word-metadata, keywords, barcode), number of pages, OFX download, and XML fields or tags. Other suitable structured files with a certificate may be used in other cases.

Figure 3:
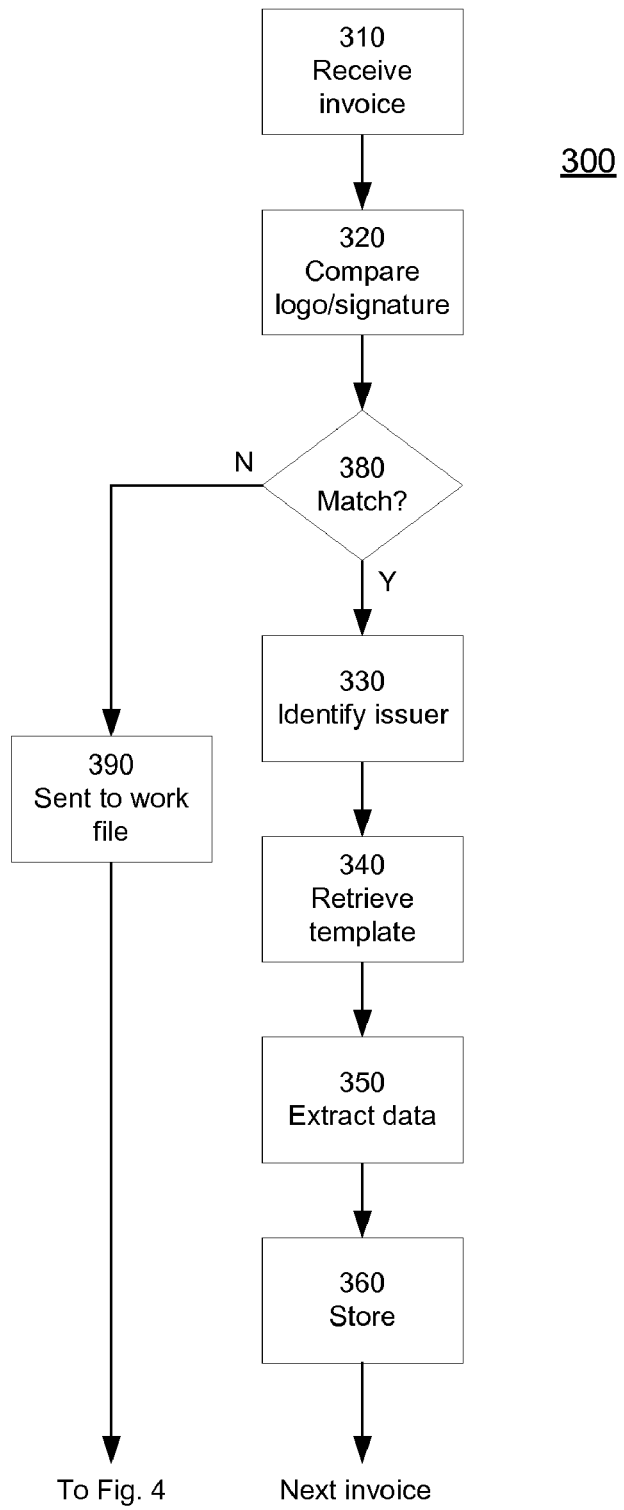
FIG. 3 is a flow diagram of an exemplary method for processing invoices according to an aspect of the invention.

FIG. 3 shows an exemplary process 300 according to the invention for processing a typical invoice, such as invoice 200 or invoice 210. The invoice image is received 310, for example by one of the ways described above. It may be emailed or uploaded or transferred by any of several electronic means from the site of service provider 110 to the site of system operator 105. The system 105 compares 320 the invoice to a database in storage system 103 that contains distinguishing features for known invoices. For example, the system 105 may search for a matching logo in a library of known issuer logos or search for a matching signature in a library of known issuer signatures. In some cases, other distinguishing features, for example the originating fax number or the email origination address, may be used in addition to or in place of the logo pattern and signature to recognize the invoice.

At step 380, the process branches. If no match is found (no branch), the image is sent 390 to a work file, in which all the unprocessed documents are stored. Treatment of the documents in this work file is explained below, in the description of FIG. 4.

If a match is found for the logo pattern or signature (yes branch), this identifies 330 the issuer. A corresponding template for the recognized invoice is also retrieved 340 from storage system 103. The template includes instructions for extracting data from the invoice, for example it may define fields identifying where and/or in what format on the invoice certain data is expected to be located. In some cases, an issuer may have more than one template. For example, it may have different templates for personal users and for business customers. As another example, the issuer may have different templates for single-page and multi-page invoices, or may simply change the format of its invoice over time or by geographic region. Accordingly, the system 105 may use more refined decision-making processes to select the correct template for a particular invoice.

Data is extracted 350 from the invoice based on the selected template, using optical character recognition (OCR) and/or other suitable means. In some cases the document may be OCR'd even before it is received 310, for example, by using .pdf files for which the software suite by Adobe and other tools by other companies may provide built-in OCR capabilities. The image then may be used to identify the issuer. In other cases, however, full recognition is done in step 350 as part of the data extraction. The information extracted in step 350 is preferably stored 360 in a database that also resides in storage system 103.

In some implementations, once an invoice has been recognized, data may be automatically extracted from the invoice (e.g., as identified by fields in a template). In another approach, invoices may be grouped together based on their similarity. Data extracted from certain locations in one invoice may be extracted from similar locations in other invoices in the group. Previously discovered data patterns may be reused on similar invoices. Data can also be manually extracted. Different pattern recognition engines, expert systems, rule-based engines and other approaches may also be used to extract data from invoices.

Processed invoices can also be used to check or refine the templates for an issuer. Differences between invoices for the same issuer or deviations from past norms can also be used to flag potential problems, as well as to request human review.

Figure 4:
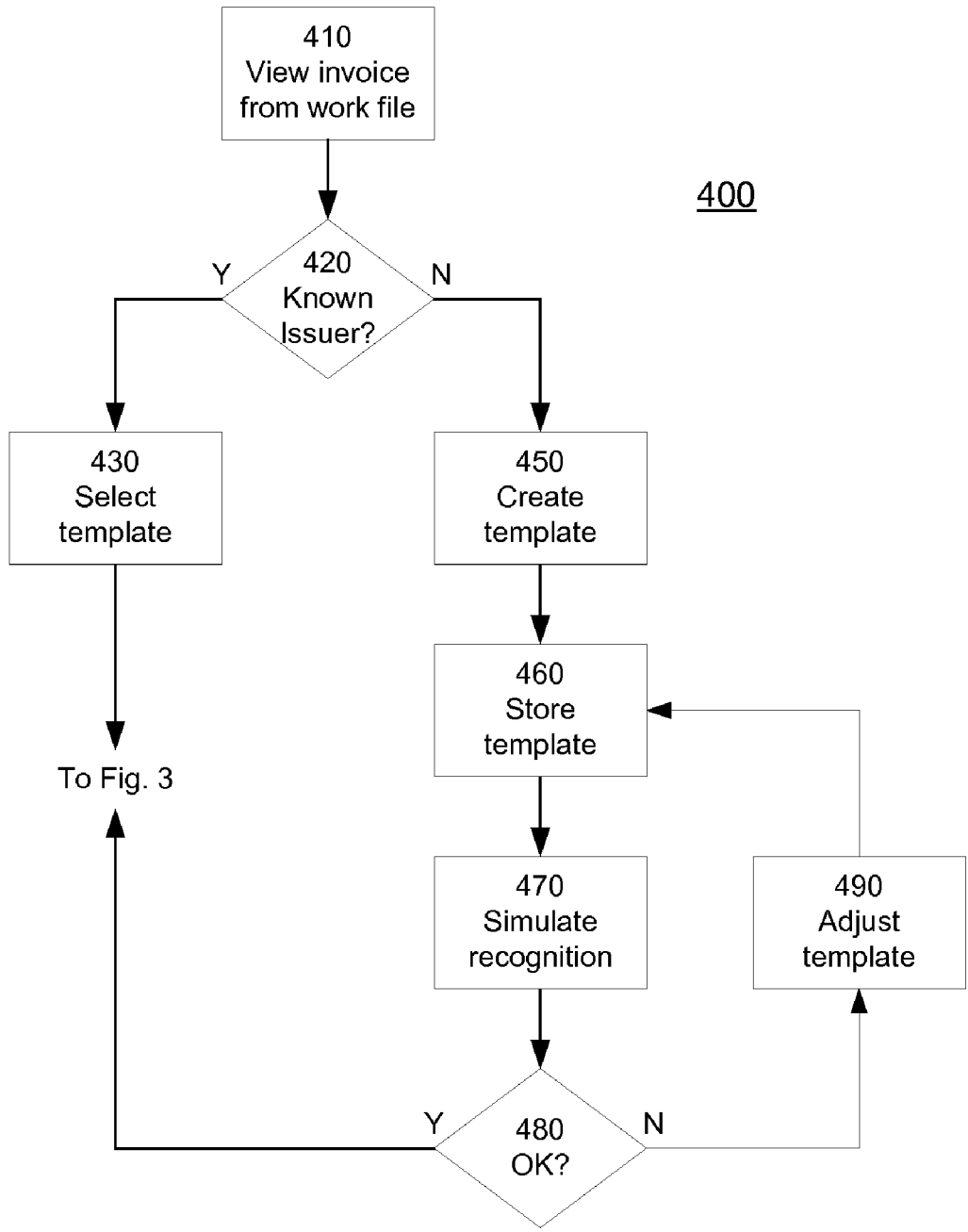
FIG. 4 is a flow diagram of an exemplary method for processing unrecognized invoices according to an aspect of the invention.

FIG. 4 shows an exemplary process 400 according to the invention for processing unrecognized invoices that were previously stored in a work file in step 390 of FIG. 3. An invoice is retrieved 410 from the work file, which resides in storage system 103. The invoice is presented for manual viewing 410 by an operator. In step 420, the process branches. If the operator determines that the invoice is a document from a known issuer (yes branch) but, for whatever reason, the logo pattern/signature recognition has not worked (for example, a coffee stain on the logo may have made the logo unreadable to the automated recognition system), the process moves to step 430. The operator selects 430 a matching template and sends 440 the invoice back to the recognition process 300 (e.g., to data extraction step 350).

If, however, in step 420, the operator determines that the invoice cannot be matched with a known template (no branch), the operator creates 450 a new template. This new template may be created completely new or it may be created by modifying a suitable existing template. The new template, along with its issuer information and the invoice, is stored 460 in storage system 103. In step 470, a recognition simulation is performed to verify that the new template works correctly. If, in step 480, the template simulation works correctly (yes branch), the invoice is sent 440 to the recognition process 300 described above. If, however, the simulation does not work correctly (no branch), the template may be manually adjusted 490. The template editor may highlight the section that created problems. For example, a field for OCR may be too narrow or too wide. If the field is too wide, for example, the system may attempt to interpret a part of the logo as a part of the address. In the case of a field that is too narrow, some characters may be cut off.

Another aspect of the invention is cross-organizational learning. For example, if a user who works at Customer A identifies an invoice as being from Vendor 1, and the system can then identify other signature items (image, "from" address, etc.), then the system may be able to use those other signature items to select the correct template for the invoice, and use that template to find the correct data in certain sections of the invoice. Additionally, if a same format invoice from this same Vendor 1 is sent to a second Customer B, then the system can recognize from the signature information that the invoice is from Vendor 1 and apply the template to the invoice to extract the correct data.

One advantage of the approach described above is that the capture of invoices can be made economical for SMEs. The number of invoices processed can be aggregated over a large number of SMEs, thus achieving economies of scale that can be shared by the businesses. In addition, although any one SME may only receive a few invoices from any particular issuer, the community of SMEs in the aggregate may receive a large number of invoices from that issuer. This then makes it cost efficient to develop templates or other processes to handle those invoices, whereas it would not be cost efficient for each SME to do so individually. The system of FIG. 1 can be implemented without significant additional investment by either the issuers or the recipients. The cost of system 105 is shared by all users and not borne entirely by one user. The recipients can send invoices to the system 105 using conventional means, such as fax and email. The invoices between issuers and recipients can be settled using conventional means. In addition, as described above with the example using Customers A and B, and Vendor 1, information learned from processing one recipient's invoices can be used to improve the overall process for all recipients.

In fact, in one approach, the community of recipients can themselves improve the process. For example, the community can provide input about distinguishing features. Various recipients and/or issuers may suggest different features for recognizing invoices. There may even be a community process for determining preferred features for distinguishing invoices. A similar process can be used to determine templates, including determining fields in templates.

Another aspect of community is that different recipients can exchange their experiences of dealing with issuers. Many recipients may be in a similar situation with respect to issuers. Another beneficial aspect of the community is that SMEs are likely to deal with "small" issuers. There will be a very large number of small issuers (approximately 25 million in the US), but each one issues invoices to only a small number of customers (typically, 20-30). While it is not economical for a centralized identification process to be applied to this set of issuers, it is economical to let the recipients themselves help identify the issuers and, in the aggregate, create a comprehensive catalog of the issuers.

It is clear that many modifications and variations of this embodiment may be made by one skilled in the art without departing from the spirit of the novel art of this disclosure. These modifications and variations do not depart from the broader spirit and scope of the invention, and the examples cited here are to be regarded in an illustrative rather than a restrictive sense.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for automatically capturing invoices issued to a community of different recipients by a plurality of different issuers, the method comprising:
   receiving invoices issued to a community of different recipients by a plurality of different issuers;
   receiving input from the community of different recipients identifying data fields or candidate distinguishing features in invoices from the plurality of different issuers;
   defining templates of invoices based at least in part on the input from the community of different recipients to extract data from the identified data fields in the invoices;
   selecting, by one or more computers, distinguishing features for the templates of invoices from the candidate distinguishing features based at least in part on the input from the community of different recipients;
   comparing, by one or more computers, the invoices to the distinguishing features, wherein a distinguishing feature selected based on an input received from a first recipient is compared with an invoice issued to a second recipient;
   selecting, by one or more computers, templates of invoices based on the comparisons to distinguishing features, each template identified with an issuer; and
   extracting, by one or more computers, data from the invoices based on the selected templates for invoice payment preparation.

2. The computer-implemented method of claim 1 wherein the step of receiving invoices comprises receiving invoices on different media.

3. The computer-implemented method of claim 2 wherein the distinguishing features depend on the media of the invoice.

4. The computer-implemented method of claim 1 wherein the distinguishing features include graphical logos of issuers.

5. The computer-implemented method of claim 1 wherein the distinguishing features include issuers' names and/or addresses.

6. The computer-implemented method of claim 1 wherein the distinguishing features include data unique to issuers.

7. The computer-implemented method of claim 1 wherein the distinguishing features include black and white histograms.

8. The computer-implemented method of claim 1 wherein the distinguishing features include color histograms.

9. The computer-implemented method of claim 1 wherein the distinguishing features include sectional signatures.

10. The computer-implemented method of claim 1 wherein the distinguishing features include sectional histograms.

11. The computer-implemented method of claim 1 wherein the step of comparing the invoices to distinguishing features includes:

performing optical character recognition (OCR) on the invoices; and comparing the OCR'd invoices to the distinguishing features.

12. The computer-implemented method of claim 1 wherein the distinguishing features include metadata in the invoices.

13. The computer-implemented method of claim 1 wherein the templates include fields and the step of extracting data from the invoices comprises extracting data from the invoices based on the fields of the selected templates.

14. A computer-readable medium on which is encoded program code, the program code comprising:

program code for receiving invoices issued to a community of different recipients by a plurality of different issuers;

program code for receiving input from the community of different recipients identifying data fields or candidate distinguishing features in invoices from the plurality of different issuers;

program code for defining templates of invoices based at least in part on the input from the community of different recipients to extract data from the identified data fields in the invoices;

program code for selecting distinguishing features for the templates of invoices from the candidate distinguishing features based at least in part on the input from the community of different recipients;

program code for comparing the invoices to the distinguishing features, wherein a distinguishing feature selected based on an input received from a first recipient is compared with an invoice issued to a second recipient;

program code for selecting templates of invoices based on the comparisons to distinguishing features, each template identified with an issuer; and program code for extracting data from the invoices based on the selected templates for invoice payment preparation.

15. The computer-readable medium of claim 14 wherein the distinguishing features include graphical logos of issuers.

16. The computer-readable medium of claim 14 wherein the distinguishing features include issuers' names and/or addresses.

17. The computer-readable medium of claim 14 wherein the distinguishing features include data unique to issuers.

18. A computer system for automatically capturing invoices issued to a community of different recipients by a plurality of different issuers, the computer system comprising:

means for receiving invoices issued to a community of different recipients by a plurality of different issuers;

means for receiving input from the community of different recipients identifying data fields or candidate distinguishing features in invoices from the plurality of different issuers;

means for defining templates of invoices based at least in part on the input from the community of different recipients to extract data from the identified data fields in the invoices;

means for selecting distinguishing features for the templates of invoices from the candidate distinguishing features based at least in part on the input from the community of different recipients;

means for comparing the invoices to the distinguishing features, wherein a distinguishing feature selected based on an input received from a first recipient is compared with an invoice issued to a second recipient;

means for selecting templates of invoices based on the comparisons to distinguishing features, each template identified with an issuer; and means for extracting data from the invoices based on the selected templates for invoice payment preparation.

19. The computer system of claim 18 wherein the distinguishing features include graphical logos of issuers.

20. The computer system of claim 18 wherein the distinguishing features include issuers' names and/or addresses.

* * * * *